Nov. 21, 1950  W. BOPP  2,531,250
FOOD MACERATOR AND LIQUIFIER
Filed March 22, 1946  2 Sheets-Sheet 1

INVENTOR.
Walter Bopp
BY Scott L. Norvell
attorney

Nov. 21, 1950 W. BOPP 2,531,250
FOOD MACERATOR AND LIQUIFIER
Filed March 22, 1946 2 Sheets-Sheet 2

INVENTOR.
Walter Bopp
BY Scott L. Norvel
Attorney

Patented Nov. 21, 1950

2,531,250

UNITED STATES PATENT OFFICE 2,531,250

FOOD MACERATOR AND LIQUEFIER

Walter Bopp, Tucson, Ariz.

Application March 22, 1946, Serial No. 656,428

4 Claims. (Cl. 100—42)

This invention relates to food macerators or liquifiers, and has for its objects, first, the provision of a power driven mechanism for pulping, macerating or liquifying vegetables, fruits or other foods in which the material to be processed is fed against the periphery of a rapidly rotating toothed spiral knife and the materials ground and forced from the area of contact past a radial screening area and to an axially disposed pulp discharge.

A second object is to provide a vegetable grinder, macerator or juicer having a rotating spiral knife adapted to cut materials fed peripherically onto it, and to carry the pulp axially for screening or other disposal.

A third object includes the mechanism above described in combination with a structure having an easily replaceable cutter housing including a radially disposed juice screen and a replaceable pulp screen at the delivery end of the cutter, together with attendant parts. The whole device may be easily dismounted for cleaning or adjustment.

A still further object includes the provision of rotary cutting means, having a spiral peripheral knife and arranged to operate at high speed within a close fitting housing; this cutter being provided with a propeller like discharge and adapted to force the cut pulp through an axially disposed screen.

Other objects will appear hereinafter.

Figure 1:
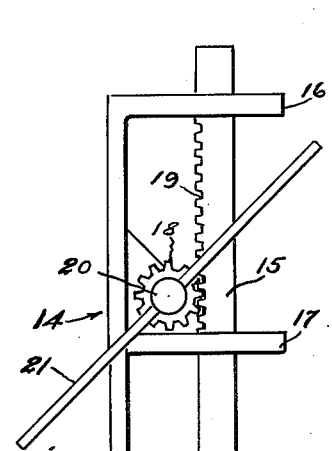
Figure 10:
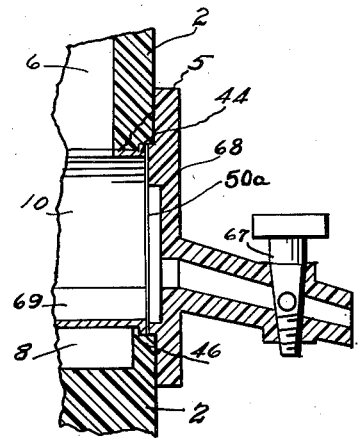
Figure 9:
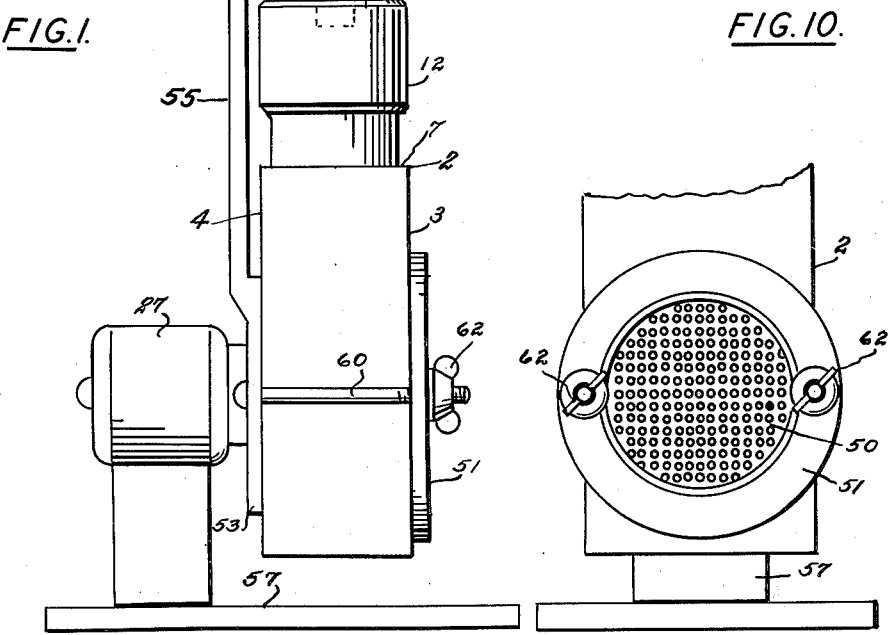
Figure 3:
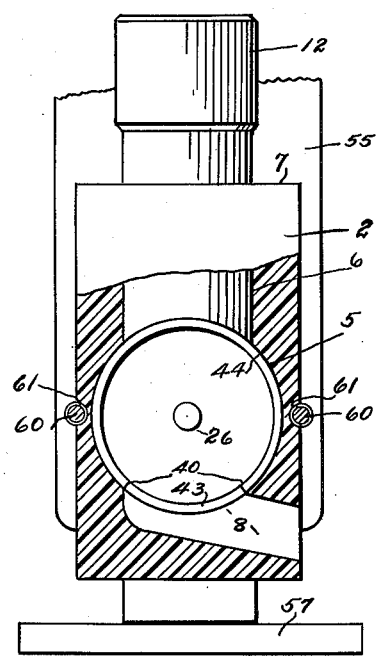
Figure 2:
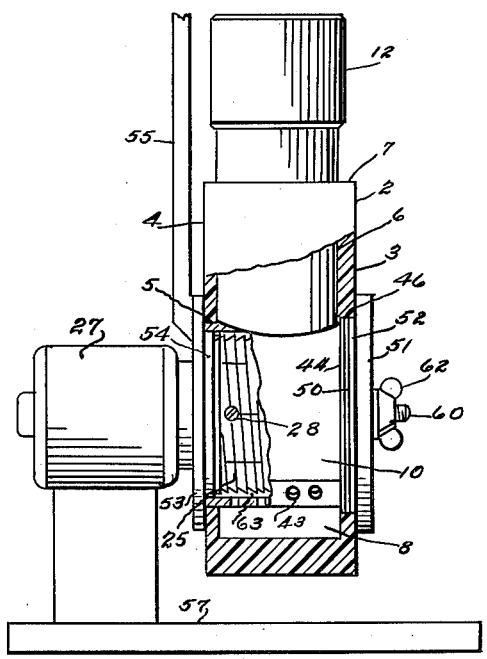
Figure 5:
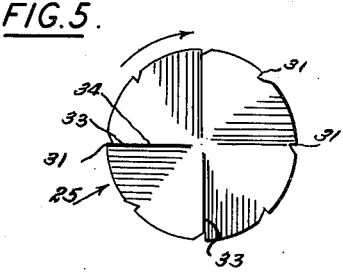
Figure 4:
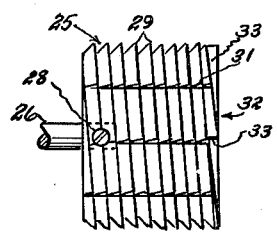
Figure 6:
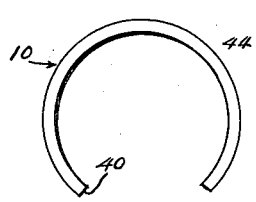
Figure 7:
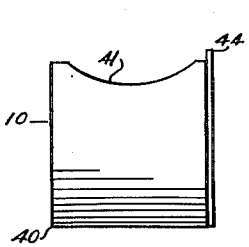
Figure 8:
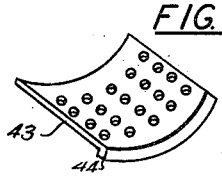

I attain the foregoing object by means of the machine, mechanism, and construction illustrated in the accompanying drawing in which:

Fig. 1 is the side view of the entire machine mounted on and supported and operated by an electric motor;

Fig. 2, a side view of the machine drawn on a somewhat larger scale and with certain parts broken away to show interior construction;

Fig. 3, an end elevation of the machine with parts of the case body broken away to show the interior construction;

Fig. 4, a side elevation of the cutter;

Fig. 5, an end view thereof;

Fig. 6, an end view of the cutter housing;

Fig. 7, a side elevation thereof;

Fig. 8, a perspective view of the juice screen;

Fig. 9, an end view of the device showing fragmentary portions of the body, the pulp screen, and the pulp screen retaining ring; and, Fig. 10, a fragmentary sectional elevation of a modification showing a juice plate and spigot in position.

Similar numerals refer to similar parts in the several views.

Referring to Fig. 1 numeral 2 indicates the body of the machine which is preferably made of transparent plastic. This body has a transverse cylindrical opening 5, extending from its outer face 3, to its inner face 4. At the top of this opening there is a vertical bore 6, leading to the upper face 7. At the bottom of opening 5, the material is cut away to provide a passage way 8 which I term the juice flow channel. The opening 5 accommodates the cylindrical cutter housing 10. Vertical bore 6 is the feed channel and cylindrical rammer 12 is operated therein with an easy working fit.

This rammer may be used to feed material directly, if desired, or the lever press 14 may be used.

This lever press includes a vertical press bar 15, operative in the frame guides 16 and 17, and the pinion 18 operative on a rack 19 on bar 15, the pinion is mounted on a shaft 20 which is turned by a cross handle 21.

The rotary cutter, shown particularly in Figs. 4 and 5, indicated generally by the numeral 25, is formed similar to a hob. It is mounted on the outwardly extending shaft 26 of motor 27 and locked in place by set screws 28, and rotates within the cutter housing 10 which is preferably made of stainless steel. The cutter is likewise made of this same material or its equivalent for the purposes concerned.

A knife is formed on the periphery of cutter 25, by a thread 29 having peripheral portions cut away parallel to the axis to form teeth 31. The outer face of thread 29 is substantially at right angles to the axis of the cutter and the other face is inclined, and extends radially outward and toward the discharge end 32. The cutter rotates clockwise when viewed from its discharge end, as shown in Fig. 5, and on its outer end face 32 four propeller-like segmental recesses 33 are formed. These recesses are cut into the metal so that their greatest depth is at the peripheral point of the radial leading edge 34. From this position the end face of the material slants outwardly, radially, and arcuately toward the other boundary edge of the recess. The cut forming the leading edge of each segmental cavity tapers from its greatest depth, which is at the periphery of the end of the cutter body, toward the center of the end of the cutter. From the edge 34, the material is shaped so that it recedes in a counter-clockwise direction until it intersects the radial leading edge of the next succeeding recess.

Cutter housing 10 is cut away along its lower side to provide a slot 40. It is also provided with a circular opening 41 at the top to register with the feed bore 6, and receive the lower end of rammer 12.

An arcuate juice screen 43 fits within slot 40 of the housing. An arcuate lip 44 is formed on the outer edge of housing 10 which fits into a corresponding groove 46 in the body part 2 and acts as a means for retaining the housing within opening 5. A pulp screen 50 fits into the outer end of opening 5 and seats against the outer edge of housing 10. This screen is held in place by a locking ring 51 which has a boss 52 adapted to fit into the end of opening 5.

On the inner face 4 of the body 2, a mounting plate 53 is secured to motor 27. This mounting plate is provided with a boss 54 concentric with the motor shaft and which fits into the inner end of housing 10.

Frame 55 carrying the press assembly 14 is attached to plate 53 by an upward extension thereof, and all of these parts in turn are supported by the motor 27 and its base amount 57.

The body part 2, plate 53, and ring 51 are all secured together by tie bolts 60, secured to plate 53 and extending outwardly through grooves 61 cut in the sides of body 2 and extending through plate 51. These bolts are provided with wing nuts 62 in order to clamp the several parts together.

The device is assembled by first securing a cutter 25 on motor shaft 26 then placing the body part 2 with the cutter housing in position on the plate 53. The arcuate juice screen 43 is then inserted, followed by adding pulp screen 50 and plate 51 and then tightening wing nuts 62.

The entire mechanism may be disassembled in a reverse manner.

Material to be treated is placed in the vertical bore 6 and the rammer 12 forced down upon it while the cutter turns clockwise and in the direction indicated by the arrow, shown in Figure 5. The material is attacked by the teeth of the spiral knife formed on the surface of the cutter, and as particles are cut loose they are forced outward along the annular area 63 between the cutter and the cutter housing. The action of the knife on the materials crowded down through bore 6 is first to macerate and cut the material, and second to press it through, around and along area 63, until it reaches the outer end 32 of the cutter. It is then propelled outward by segmental recesses 33 and forced through screen 50. Juices are pressed and forced through juice screen 43 and are led out through opening 8. Pulp, carried to the end of the cutter housing, is forced through pulp screen 50 and may be collected in a receptacle placed below it.

It is obvious that the end screen may be replaced by a solid plate 68 as is shown in Fig. 10. In this case the plate is provided with a pulp discharging spigot 67. Juice screen 43 may also be replaced by a solid arcuate plate 69 if desired and the whole of the ground and macerated material forced through the end or pulp screen 50a.

Obviously these screens may be of any size mesh desired. They are preferably made of punched stainless steel and not from interwoven wire mesh.

Where the machine is to be used to produce liquid carrot juice it is set up with solid plate 68, and a fine screen is placed in the bottom of the cutter housing and the juice is drawn off through channel 8 while pulp is collected through spigot 67. On the other hand, if it is desired to reduce vegetables, such as onions, to a finely chopped or macerated state, the screen in the bottom of the cutter housing is replaced by a solid plate 69 and a fine pulp screen 50a which may then be held in place by ring 51, placed at the end of cutter. All of the ground materials then, both pulp and juice are forced out through this end screen.

To those familiar with the art, various changes, additions and alterations may become apparent, however all of these changes and the like may well remain within the spirit of the invention and therefore I wish to be limited only by the following claims.

I claim:

1. A food grinder and liquifier comprising in combination, a body block having a horizontal cutter housing bore, a vertical feeder bore intersecting said housing bore, a rammer operative in the vertical bore, a metallic replaceable cutter housing lining said horizontal bore, a cutter having a series of teeth arranged on a peripheral spiral knife thereon and segmental propeller recesses formed on its delivery end, said cutter being mounted on an axial shaft in said housing, and a screening plate enclosing the delivery end of said horizontal bore.

2. A food grinder and liquifier comprising a body block of transparent synthetic resin having a cutter housing bore extending therethrough from front to back, a vertical feed bore opening into said cutter housing bore, a juice delivery duct extending from the bottom of said cutter housing bore to the exterior of said body block, a feed rammer operative in said vertical feed bore, a rack and pinion press operative to force said rammer into said vertical bore, a cutter housing lining said cutter housing bore, having a segmental bottom opening co-extensive with the opening of said juice delivery duct, an arcuate juice screen fitted into the segmental bottom opening, a replaceable pulp screen closing the outer end of said housing bore, a locking ring securing said screen against the outer end of said cutter housing, a mounting plate forming means of support and closing the inner end of said cutter housing, an operative shaft extending axially thru said mounting plate adapted to carry a removable cutter, a cylindrical cutter secured on said shaft having a spiral knife formed on its peripheral surface, with the convolutions thereof interrupted by longitudinally extending grooves forming teeth, angularly faced radially receding segmental recesses formed on the outer delivery end of said knife adapted to force material passing over its end axially outward, and means for rotating said cutter shaft.

3. A food grinder and liquifier as described in claim 2, wherein said body block is laterally embraced by threaded bolts extending outward thru the mounting plate and said locking ring, and wing nuts operative on the ends of said bolts whereby said body block, the cutter housing, said pulp screen and locking ring are secured together and supported on said mounting plate.

4. A food grinder and liquifier comprising a body block of transparent synthetic resin having a cutter housing bore extending therethrough from front to back, a vertical feed bore opening into said cutter housing bore, a juice delivery duct extending from the bottom of said cutter housing bore to the exterior of said body block, a feed rammer operative in said vertical feed bore, a rack and pinion press operative to force said rammer into said vertical bore, a cutter housing lining said cutter housing bore, having a segmental bottom opening co-extensive with the opening of said juice delivery duct, an arcuate juice screen fitted into the segmental bottom opening, a replaceable closed, outer cutter housing plate having a spigot valve attached thereto, a mounting plate forming means of support and closing the inner end of said cutter housing, an operative shaft extending axially through said mounting plate adapted to carry a removable cutter, a cylindrical cutter secured on said shaft having a spiral knife formed on its peripheral surface, with the convolutions thereof interrupted by longitudinally extending grooves forming teeth, angularly faced radially receding segmental recesses formed on the outer delivery end of said knife adapted to force material passing over its end axially outward, and means for rotating said cutter shaft.

WALTER BOPP.

REFERENCES CITED

The following references are of record in the file of this patent:

UNITED STATES PATENTS

| Number | Name | Date |
|---|---|---|
| 666,525 | Hopkins | Jan. 22, 1901 |
| 1,726,475 | Druffel | Aug. 27, 1929 |
| 1,989,231 | Gilliatt | Jan. 29, 1935 |
| 2,162,564 | Poliner | June 13, 1939 |
| 2,315,028 | Thomas | Mar. 30, 1943 |
| 2,345,683 | Owens | Apr. 4, 1944 |
| 2,403,193 | Rawson | July 2, 1946 |
| 2,432,605 | Barach | Dec. 16, 1947 |

FOREIGN PATENTS

| Number | Country | Date |
|---|---|---|
| 443,481 | Great Britain | Feb. 28, 1936 |